United States Patent [19]

Swager

[11] Patent Number: 5,046,881

[45] Date of Patent: Sep. 10, 1991

[54] LOCKABLE PIN AND CLEVIS

[76] Inventor: William E. Swager, P.O. Box 750, Fremont, Ind. 46737

[21] Appl. No.: 649,748

[22] Filed: Feb. 1, 1991

[51] Int. Cl.$^5$ ............................................. F16C 11/06
[52] U.S. Cl. ................................... 403/154; 403/317; 403/324; 59/86
[58] Field of Search ............... 403/154, 155, 317, 324, 403/20; 292/303, 152; 59/86

[56]  References Cited

U.S. PATENT DOCUMENTS

| | | | |
|---|---|---|---|
| 2,097,465 | 11/1937 | Morrison | 54/86 |
| 2,580,495 | 1/1952 | Woods | 292/152 X |
| 4,102,124 | 7/1978 | Swager | 403/154 X |
| 4,896,989 | 1/1990 | Swager | 403/154 |

Primary Examiner—Andrew V. Kundrat
Attorney, Agent, or Firm—Hill, Van Santen, Steadman & Simpson

[57] ABSTRACT

A locking pin and clevis wherein a slidable lockable member engages one end of the pin to lock it and a spring can be locked to said slide member to prevent it from moving to the unlocked position. The spring can be disengaged with the slide member to allow the slide member to be moved to the unlocked position so that the pin can be moved out of engagement with the one end of the clevis.

5 Claims, 1 Drawing Sheet

LOCKABLE PIN AND CLEVIS

BACKGROUND OF THE INVENTION

1. Field of the Invention

This invention relates in general to a lockable pin and clevis and in particular to an improved locking device for use with load lifting and safety restraints such as cables, chains and ropes and more particularly is related to a lockable pin retaining coupling for locking a pin to a clevis so as to maintain it in the closed or open position.

2. Description of Related Art

This invention is an improvement on U.S. Pat. No. 4,896,989 which issued on Jan. 30, 1990.

The present invention relates to an improved pin and clevis device wherein the pin extends through both of the clevis and is locked in position by a slidable moving collar member which positively prevents the pin from being withdrawn from the clevis. A spring fits over the locking collar to hold the collar in the locked position in engagement with the pin. The spring can be moved to a second position so as to allow the collar to be moved to the unlocked position so that the pin can be withdrawn from the first end of the clevis. The pin is also formed with an annular groove and a longitudinal groove into which a pin extends from the other leg of the clevis which allows the pin to be moved only when the position is such that the locking pin is aligned with the grooves in the pin.

SUMMARY OF THE INVENTION

It is an object of the invention to provide a safety device which allows a pin to be locked and unlocked from a clevis under conditions where the pin will not separate from the clevis so that the user can lock and unlock the pin from the clevis using one hand without dropping either the pin or the clevis.

Individuals using safety equipment such as in mountain climbing or window washing or the climbing of towers require a coupling that can be quickly and simply operated without any of the parts being dropping and wherein the pin will not accidentally open or close during use.

It is also important that the locking and unlocking means for the pin and clevis be simple and capable of being operated with one hand.

It is an object of the present invention to provide an improved coupling device which is maintenance free and has a minimum number of mechanical parts and which can be operated by the user with one hand.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
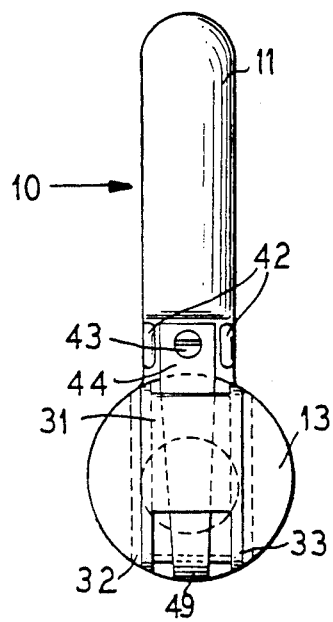
FIG. 1 is a side plan view of the clevis and pin of the invention.

The FIGS. illustrate the locking device 10 which comprises a clevis 11 with a first end 12 and a second end 13 both of which are formed with openings 17 and 15 through which a locking pin 14 is received. The locking pin 14 has knurled head 16 which is enlarged so as to engage the portion 12 when in the locked position. The other end of the pin 14 is formed with a groove 26 between an enlarged head portion 27 so as to provide a locking groove 26 which is engageable with a locking slide member 31 mounted on the second end 13.

The pin 14 is formed with an annular groove 18 adjacent the knurled head 16 which communciates with the longitudinal groove 23 that terminates before the groove 26. A pin 21 is mounted in an opening 22 of leg 12 and has an end 20 that extends into the groove 18 when the pin is locked as shown in FIG. 2 and into the groove 23 if the pin has been unlocked and moved to the left as shown in FIG. 5.

Figure 2:
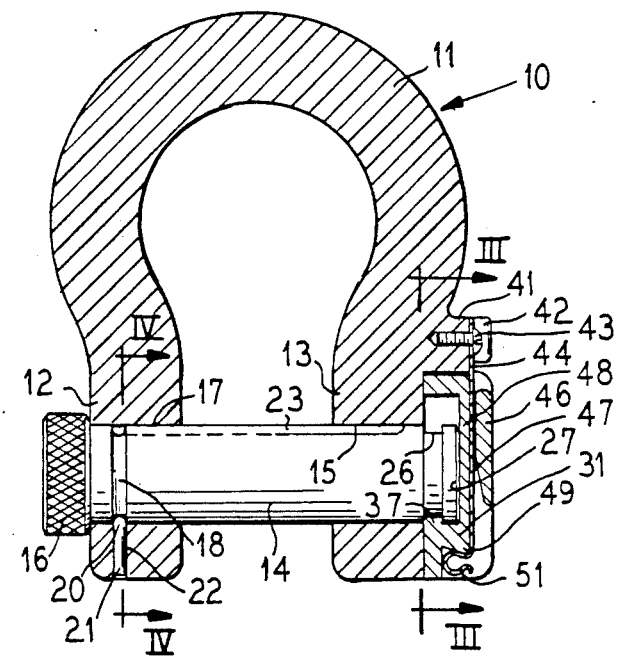
FIG. 2 is a sectional view of the invention.
Figure 3:
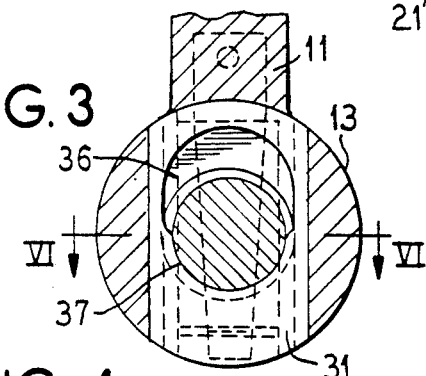
FIG. 3 is a sectional view taken on line III—III from FIG. 2.
Figure 6:
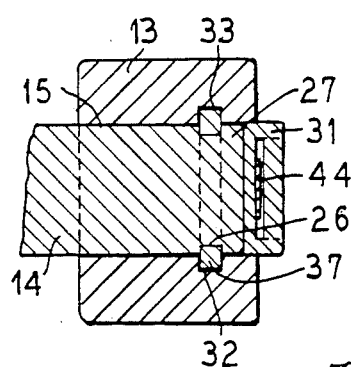
FIG. 6 is a detailed sectional view taken on line VI—VI in FIG. 3 showing the pin in the locked position.
Figure 5:
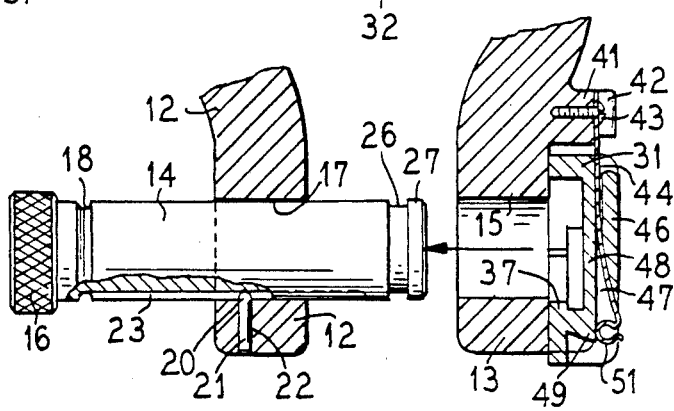
FIG. 5 is a sectional view showing the pin in the unlocked position.

As shown in FIGS. 2, 3, 5 and 6, the second end 13 is provided with the sliding locking member 31 which moves transversely of the pin 14 and is retained in grooves 32 and 33 formed in the end 13. The member 31 is formed with an opening 36 as shown in FIG. 3 which is larger than the pin 14 and which has a smaller portion 37 which engages te head 24 of the locking member 31 in the groove 26 of the pin so as to lock the head 27 of the pin as shown in FIGS. 1, 2, 3 and 6 so that the pin 14 cannot be withdrawn from the second end 13 when the slide member is in the position shown in FIGS. 1, 2, 3, and 6. A portion 41 extends from the end 13 and a spring 44 is attached to the portion 41 by a set screw 43 between protective ears 42 as shown in FIGS. 1, 2 and 5. The spring 44 extends through an opening 47 formed in the slide member 31 and has an end 51 which in the locked position is engageable with an extension 49 of member 31 as shown, for example, in FIGS. 1 and 2. A portion 46 is to the right relative to FIGS. 2 and 5 of the spring 44 to allow the thumb of the user to move the slide member 31 downwardly relative to FIGS. 2, 3 and 5 when it is unlocked when the end 51 of the spring 44 is out of engagement with the extension 49 of the slide member. Such condition is shown in FIGS. 5 wherein the end 51 has been moved by the user to the right relative to the FIG. so that the spring end 51 no longer locks the slide member 31 in the up position so that the slide member portion 37 can be moved to the down position thus unlocking the member 31 from the groove 26 of the pin 14 so that the head 27 can move through the opening 15 to the left relative to FIG. 5 thus allowing the pin 14 to be unlocked from the end 13 and removed to allow the clevis to be opened.

In use, if the pin 14 is in the locked position illustrated in FIGS. 1, 2, 3 and 6, it may be unlocked by moving the end 51 of the spring 44 to the right out of engagement with the extension 49 as shown in FIG. 5. Then the slide member 31 can be moved downwardly relative to FIGS. 2, 3 to the position shown in FIG. 5 so that the portion 37 of the slide member no longer fits in the groove 26 so that the pin 14 can be moved to the left relative to FIG. 5, for example.

For the pin 14 to be moved to the left after the slide member has been unlocked, pin 14 must be rotated so that the pin 21 has its end 20 aligned with the groove 23 after which the pin 14 can be moved to the left as shown in FIG. 5. It is to be particularly noted that the pin 21 prevents the locking pin 14 from being withdrawn from the opening 17 of the first end 12 of the clevis 11 because the pin 21 limits the movement of the pin 14 to the left relative to the clevis since the groove 23 terminates before the right end relative to FIG. 5 of the pin and, thus, the pin 14 cannot be completely withdrawn from the end 12 of the clevis.

Figure 4:
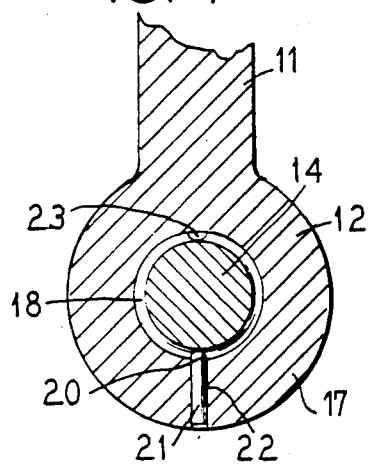
FIG. 4 is a sectional view of clevis and pin.

To relock the pin 14 in the clevis the pin 14 is moved to the right relative to FIG. 5 so that the groove 26 is aligned with the slide member 31 and then the slide member is moved up so that portion 37 engages in the groove 26 to lock the pin in the second end 13. Then the spring end 51 is depressed to the left relative to FIG. 5 so that it locks over the extension 45 of the slide member 31 to lock the slide member in the up position as illustrated in FIGS. 1, 2, 3 and 6. The pin 14 may be rotated by the head 16 so that the end 20 of pin 21 moves out of alignment with the groove 23 to the position for example, shown in FIGS. 2 and 4.

Although the groove 26 is shown as an annular groove, it is to be realized that instead of an annular groove, a groove on one or both sides of the pin 14 could be formed which allow the member 31 to lock the pin 14.

It is seen that the invention provides a positively locking pin and clevis arrangement and although the invention has been described with respect to preferred embodiments, it is not to be so limited as changes and modifications can be made which are within the full intended scope of the invention as defined by the appended claims.

We claim as our invention:

1. A safety locking device comprising, a clevis with two legs each of which is formed with aligned openings, a pin with an enlarged head on one end receivable through said aligned openings, a first transverse groove formed adjacent the second end of said pin, a slide member slidably mounted on one leg of said clevis and formed with an opening with a first portion large enough to allow said pin to extend therethrough and a second portion which is small enough to engage said pin in said first groove to lock it so that said pin can be locked when said slide member is in a first position and so that said pin can be unlocked when said slide member is in a second position, and a locking member with one end attached to said one leg of said clevis and having a second end detachably connected to said slide member to prevent it from moving relative to said clevis.

2. A safety locking device according to claim 1 wherein said locking member is a spring which has an engaging portion on its second end that engages an extension on said clevis so as to lock said slide member in the locked position.

3. A safety locking device according to claim 2 wherein said spring is a leaf spring.

4. A safety locking device according to claim 3 including a second longitudinal groove formed in said pin between said first and second ends, and an extending member mounted in said second leg of said clevis and receivable in said second groove.

5. A safety locking device according to claim 4 including a third transverse groove formed in said pin adjacent said first end and in communication with said second groove.

* * * * *

UNITED STATES PATENT AND TRADEMARK OFFICE
CERTIFICATE OF CORRECTION

PATENT NO. : 5,046,881
DATED      : September 10, 1991
INVENTOR(S) : William E. Swager It is certified that error appears in the above—identified patent and that said Letters Patent is hereby corrected as shown below:

Column 1, line 18, "both of" should read --both ends of--,

Column 1, line 44, "dropping" should read --dropped--,

Column 2, line 30, "The member" should read --The locking member--

Column 2, line 33, "te" should read --the--,

Column 3, line 30, "which allow" should read --which would allow--.

Signed and Sealed this

Seventh Day of December, 1993

Attest:

BRUCE LEHMAN

Attesting Officer

Commissioner of Patents and Trademarks